(12) United States Patent
Wang et al.

(10) Patent No.: US 12,380,650 B2
(45) Date of Patent: Aug. 5, 2025

(54) METHOD FOR REDUCING COMPUTATIONAL LOADING WHILE GENERATING CONTENT AND HOST

(71) Applicant: HTC Corporation, Taoyuan (TW)

(72) Inventors: Chung-Yi Wang, Taoyuan (TW); Ming-Feng Yeh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 169 days.

(21) Appl. No.: 18/502,074

(22) Filed: Nov. 5, 2023

(65) Prior Publication Data

US 2025/0148718 A1  May 8, 2025

(51) Int. Cl.
G06T 17/20 (2006.01)
G06T 15/04 (2011.01)
G06T 19/00 (2011.01)

(52) U.S. Cl.
CPC ............ *G06T 17/205* (2013.01); *G06T 15/04* (2013.01); *G06T 19/00* (2013.01); *G06T 2219/2021* (2013.01)

(58) Field of Classification Search
None
See application file for complete search history.

(56) References Cited

U.S. PATENT DOCUMENTS

2020/0104975 A1* 4/2020 Banerjee ............... A63F 13/428

FOREIGN PATENT DOCUMENTS

CN 114972265 8/2022
CN 110999285 2/2023

OTHER PUBLICATIONS

Cenydd et al. Optimising Underwater Environments for Mobile VR, Oct. 9, 2019, The Eurographics Association, 19-25 (Year: 2019).*

* cited by examiner

*Primary Examiner* — Robert J Craddock
(74) *Attorney, Agent, or Firm* — JCIPRNET

(57) ABSTRACT

The embodiments of the disclosure provide a method for reducing computational loading while generating a content and a host. The method includes: obtaining a texture map and a plurality of object texture coordinates, wherein the object texture coordinates correspond to at least one virtual object in the texture map; obtaining a first mesh map corresponding to the texture map; determining a first mesh segment and a second mesh segment within the first mesh map based on the object texture coordinates, wherein the first mesh segment does not correspond to the object texture coordinates, and the second mesh segment corresponds to the object texture coordinates; modifying the first mesh map into a second mesh map via reducing a first segment area of the first mesh segment; and generating a visual content via performing an asynchronous time warp operation on the texture map based on the second mesh map.

20 Claims, 5 Drawing Sheets

METHOD FOR REDUCING COMPUTATIONAL LOADING WHILE GENERATING CONTENT AND HOST

BACKGROUND

1. Field of the Invention

The present disclosure generally relates to a mechanism for generating content, in particular, to a method for reducing computational loading while generating a content and a host.

2. Description of Related Art

In Augmented Reality (AR) technology, digital or virtual objects (i.e., AR objects) are overlaid onto the real world through the use of cameras and sensors, and these objects are expected to appear as if they are integrated with the physical surroundings.

However, since the user wearing the AR device (e.g., AR glasses) may make movements such as turning the head thereof, the virtual objects in the AR content may not be well overlaid onto the real world due to the issue named pose delay.

A "pose delay" in the field of Augmented Reality (AR) typically refers to a lag or delay in the tracking and updating of the position and orientation (i.e., the pose) of virtual objects in an AR environment.

In the existing technology, the graphic processing unit (GPU) in the AR device may perform an asynchronous time warp (ATW) operation to mitigate the problem of the pose delay.

See FIG. 1, which shows the mechanism of generating visual contents. In FIG. 1, the GPU may perform the ATW operation to generate the visual content 13 (e.g., an AR content) based on the texture map 11 (which involves the AR objects 111 and 112) from the AR application and the associated mesh map 12. Since the computational loading of the GPU highly depends on the size/content of the mesh map 12 associated with the texture map 11, the computational loading of the GPU during the ATW operation may be reduced if the size/content of the mesh map 12 is properly reduced.

SUMMARY OF THE INVENTION

Accordingly, the disclosure is directed to a method for reducing computational loading while generating a content and a host, which may be used to solve the above technical problems.

The embodiments of the disclosure provide a method for reducing computational loading while generating a content, applied to a host. The method includes: obtaining, by the host, a texture map and a plurality of object texture coordinates, wherein the plurality of object texture coordinates correspond to at least one virtual object in the texture map; obtaining, by the host, a first mesh map corresponding to the texture map; determining, by the host, a first mesh segment and a second mesh segment within the first mesh map based on the plurality of object texture coordinates, wherein the first mesh segment does not correspond to the plurality of object texture coordinates, and the second mesh segment corresponds to the plurality of object texture coordinates; modifying, by the host, the first mesh map into a second mesh map via reducing a first segment area of the first mesh segment; and generating, by the host, a visual content via performing an asynchronous time warp operation on the texture map based on the second mesh map.

The embodiments of the disclosure provide a host including a non-transitory storage circuit, a processor, and a graphic processing unit. The non-transitory storage circuit stores a program code. The processor is coupled to the non-transitory storage circuit and accessing the program code to perform: obtaining a texture map and a plurality of object texture coordinates, wherein the plurality of object texture coordinates correspond to at least one virtual object in the texture map; obtaining a first mesh map corresponding to the texture map; determining a first mesh segment and a second mesh segment within the first mesh map based on the plurality of object texture coordinates, wherein the first mesh segment does not correspond to the plurality of object texture coordinates, and the second mesh segment corresponds to the plurality of object texture coordinates; modifying the first mesh map into a second mesh map via reducing a first segment area of the first mesh segment. The graphic processing unit is coupled to the processor and generates a visual content via performing an asynchronous time warp operation on the texture map based on the second mesh map.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
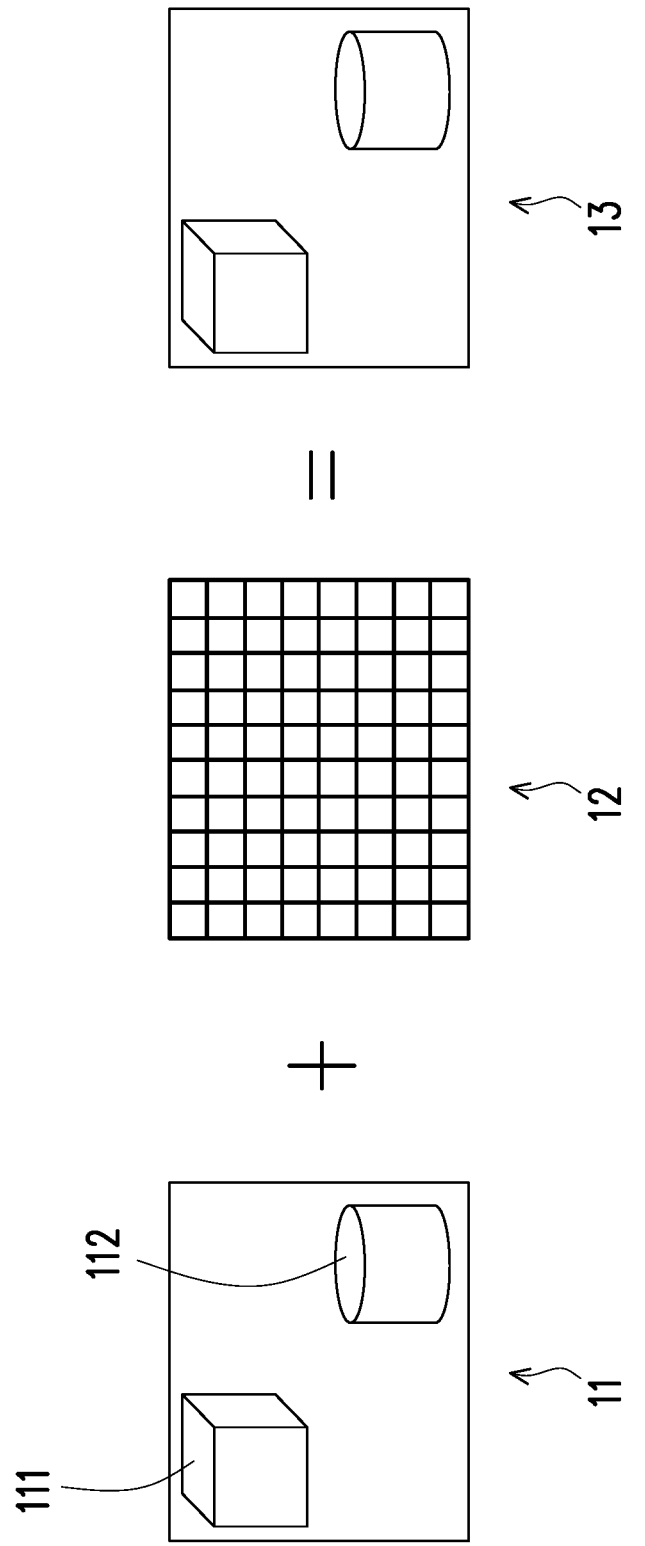
FIG. 1 shows the mechanism of generating visual contents

Reference will now be made in detail to the present preferred embodiments of the invention, examples of which are illustrated in the accompanying drawings. Wherever possible, the same reference numbers are used in the drawings and the description to refer to the same or like parts.

Figure 2:
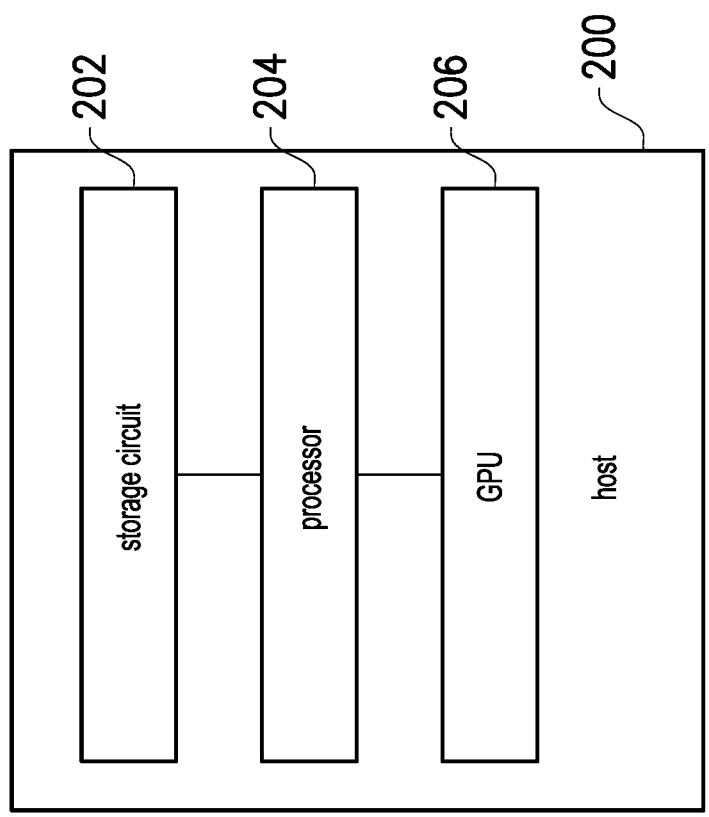
FIG. 2 shows a schematic diagram of a host according to an embodiment of the disclosure.

See FIG. 2, which shows a schematic diagram of a host according to an embodiment of the disclosure. In various embodiments, the host 200 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 200 can be a head-mounted display (HMD) capable of showing/providing visual contents (e.g., AR/VR contents) for the wearer/user to see. For better understanding the concept of the disclosure, the host 200 would be assumed to be an AR device (e.g., a pair of AR glasses) for providing AR contents (which may include virtual objects to be overlaid onto the real world) to the user, but the disclosure is not limited thereto. In some embodiments, the host 200 can be any device/system capable of performing the method proposed in the disclosure at the runtime (e.g., the framework between the application and the real hardware in a machine).

In FIG. 2, the host 200 includes a storage circuit 202, a processor 204, and a GPU 206. The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202 and the GPU 206, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program code stored in the storage circuit 202 to implement the method for reducing computational loading while generating a content provided in the disclosure, which would be further discussed in the following.

Figure 3:
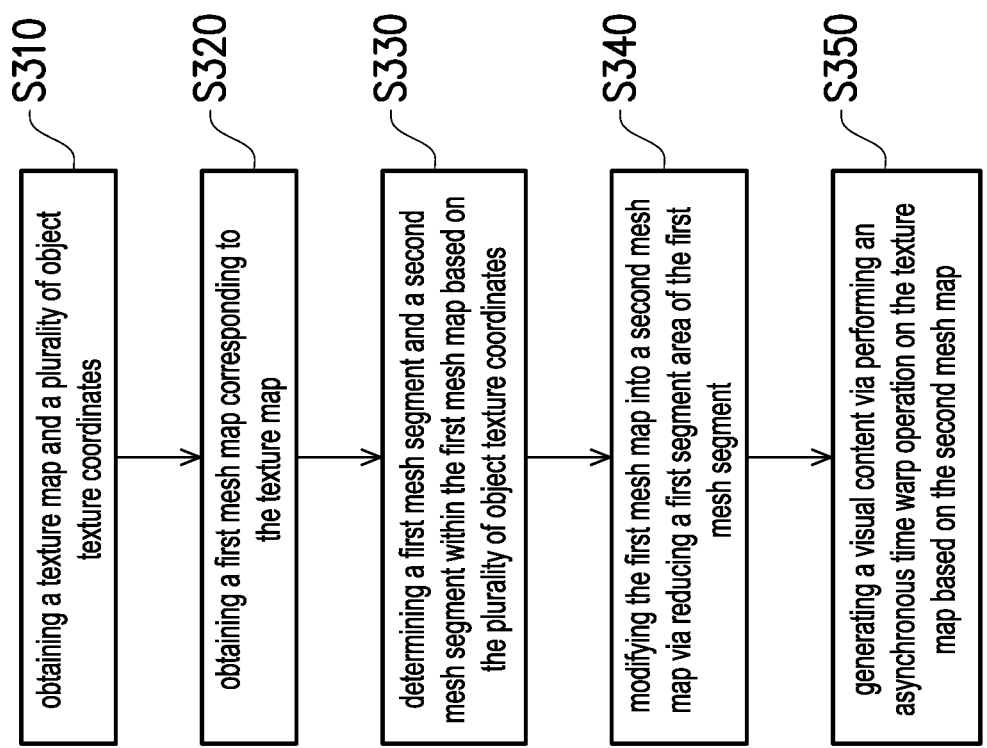
FIG. 3 shows a flow chart of the method for reducing computational loading while generating a content according to an embodiment of the disclosure.

See FIG. 3, which shows a flow chart of the method for reducing computational loading while generating a content according to an embodiment of the disclosure. The method of this embodiment may be executed by the host 200 in FIG. 2, and the details of each step in FIG. 3 will be described below with the components shown in FIG. 2. In addition, for better understanding the concept of the disclosure, FIG. 4 would be used as an example, wherein FIG. 4 shows an application scenario according to an embodiment of the disclosure.

In step S310, the processor 204 obtains a texture map 40 and a plurality of object texture coordinates, wherein the plurality of object texture coordinates correspond to virtual objects 401 and 402 in the texture map 40.

In the embodiments of the disclosure, the texture coordinates in the texture map 40 may be characterized by the corresponding UV coordinate. For example, the upper left corner of the texture map 40 may be defined to have a UV coordinate (0, 0), the upper right corner of the texture map 40 may be defined to have a UV coordinate (0, 1), the lower left corner of the texture map 40 may be defined to have a UV coordinate (1, 0), the lower right corner of the texture map 40 may be defined to have a UV coordinate (1, 1), but the disclosure is not limited thereto.

Figure 4:
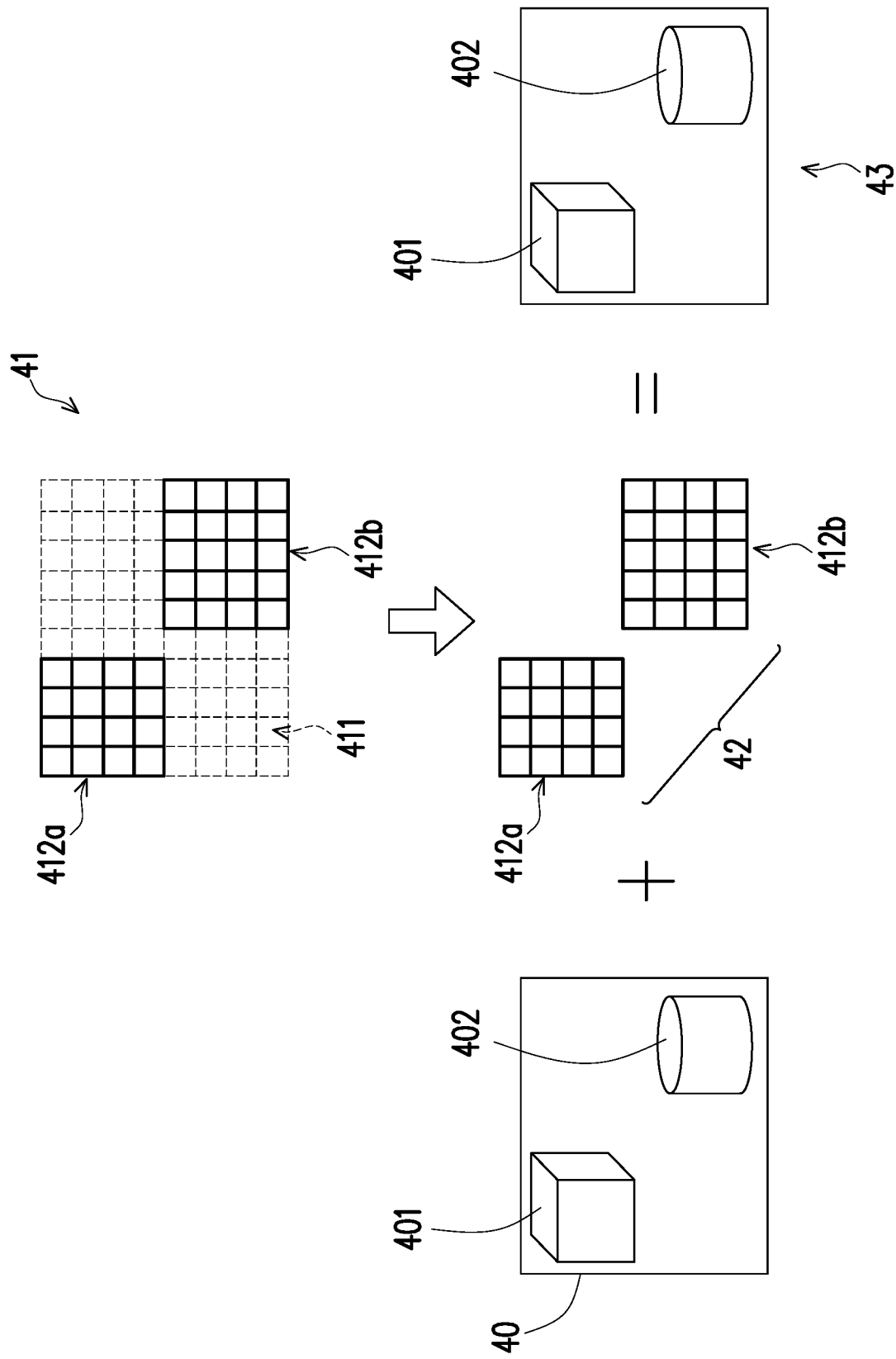
FIG. 4 shows an application scenario according to an embodiment of the disclosure.

In FIG. 4, the texture coordinates corresponding to the virtual objects 401 and 402 may be referred to as the object texture coordinates, and the texture coordinates not corresponding to any virtual object may be referred to as the non-object texture coordinates, but the disclosure is not limited thereto.

In one embodiment, the processor 204 may receive the texture map 40 and the plurality of object texture coordinates from a first application (e.g., an AR application) providing the reality service (e.g., the AR service). That is, the first application not only provides the texture map 40, but also provides the object texture coordinates corresponding to the virtual objects 401 and 402.

In step S320, the processor 204 obtains a first mesh map 41 corresponding to the texture map 40. In the embodiments of the disclosure, the first mesh map 41 may be a regular mesh map used for the ATW operation.

In FIG. 4, the first mesh map 41 may include a plurality of mesh faces, which are illustrated as the rectangular/square grids within the first mesh map 41. In other embodiments, the mesh faces can also be characterized as triangles within the first mesh map, but the disclosure is not limited thereto.

In FIG. 4, each mesh face includes, for example, four vertices, and the adjacent mesh faces may have shared vertices. That is, two or more mesh faces may have the same vertices.

In step S330, the processor 204 determines a first mesh segment and a second mesh segment within the first mesh map 41 based on the plurality of object texture coordinates, wherein the first mesh segment does not correspond to the plurality of object texture coordinates, and the second mesh segment corresponds to the plurality of object texture coordinates.

In FIG. 4, the processor 204 may determine the first mesh segment 411 not corresponding to the plurality of object texture coordinates (i.e., not corresponding to the virtual objects 401 and 402). In the scenario of FIG. 4, the first mesh segment 411 may include the mesh faces illustrated with dotted lines.

In addition, the processor 204 may determine the second mesh segments 412a and 412b corresponding to the plurality of object texture coordinates (i.e., corresponding to the virtual objects 401 and 402).

In step S340, the processor 204 modifying the first mesh map 41 into a second mesh map 42 via reducing a first segment area of the first mesh segment 411.

In FIG. 4, the processor 204 may adjust the first segment area of the first mesh segment 411 to be, for example, zero via modifying the positions of the vertices of the mesh faces within the first mesh segment 411. For example, the processor 204 may determine which of the vertices within the first mesh segment 411 are not shared by the second mesh segments 412a and 412b and adjust the positions of these vertices to be on the same line or point, such that the area of each mesh face within the first mesh segment 411 is adjusted to be zero. In this case, the first segment area of the first mesh segment 411 would become zero accordingly as shown in the second mesh map 42 of FIG. 4.

In the embodiments of the disclosure, the processor 204 may reduce the first segment area of the first mesh segment 411 while maintaining a second segment area of each of the second mesh segment 412a and 412b.

In step S350, the GPU 206 generates a visual content 43 via performing an asynchronous time warp operation on the texture map 40 based on the second mesh map 42.

In FIG. 4, since the GPU 206 only needs to determine the pixels corresponding to the second mesh segments 412a and 412b within the second mesh map 42 during the ATW operation, the computational loading of the GPU 206 can be reduced, which improves the efficiency of the ATW operation. Accordingly, the virtual objects 401 and 402 can be better overlaid onto the real world in real-time, and hence the user experience can be improved.

Noted that although the first segment area of the first mesh segment 411 is adjusted to be zero in FIG. 4, the computational loading of the GPU 206 can be reduced as long as the first segment area of the first mesh segment 411 is reduced. That is, the first segment area of the first mesh segment 411 does not have to be zero for reducing the computational loading of the GPU 206.

Figure 5:
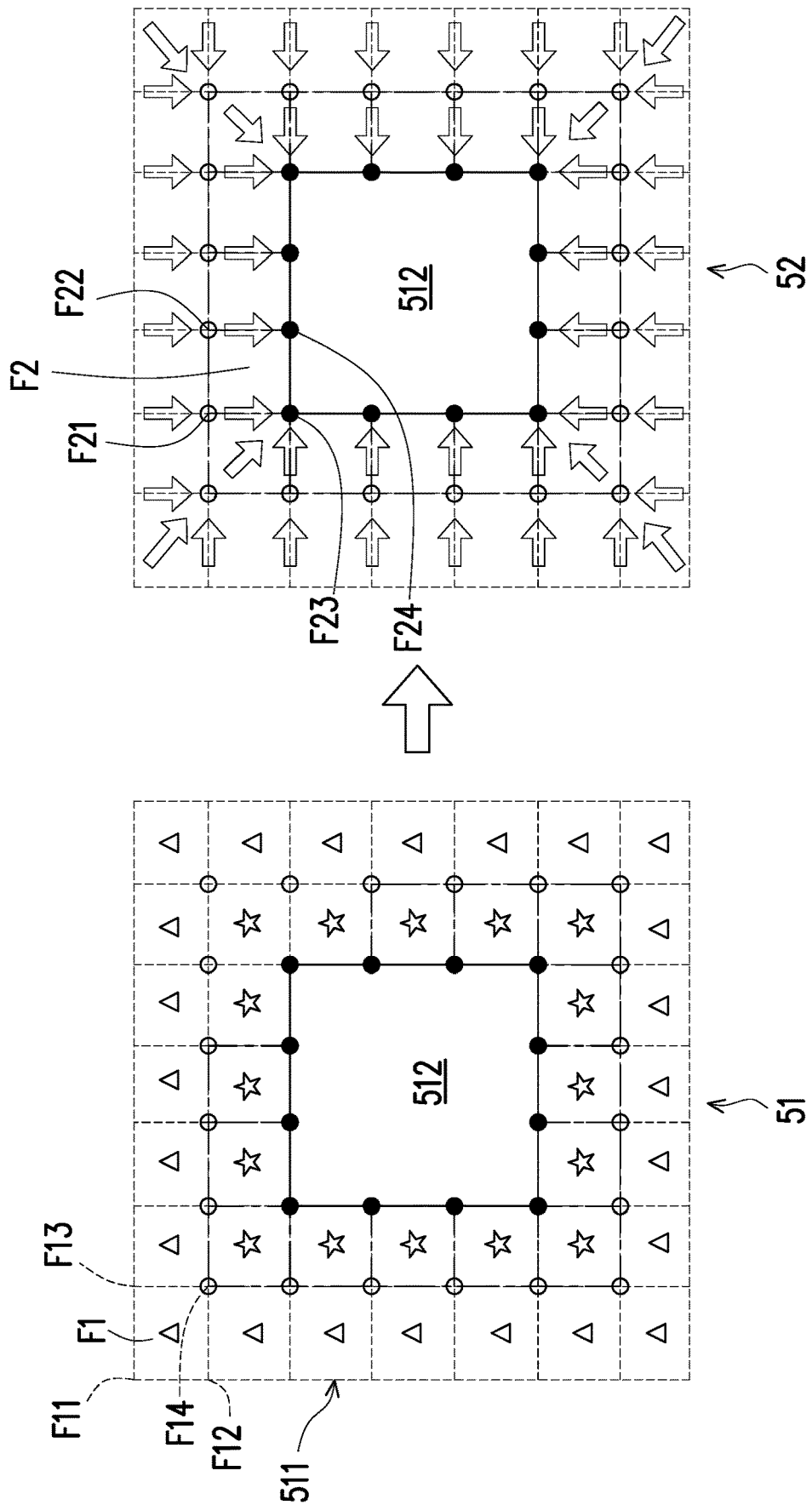
FIG. 5 shows a schematic diagram of modifying the first mesh map into the second mesh map according to an embodiment of the disclosure.

See FIG. 5, which shows a schematic diagram of modifying the first mesh map into the second mesh map according to an embodiment of the disclosure.

In FIG. 5, assuming that the processor 204 determines a first mesh segment 511 (not corresponding to any virtual object in the associated texture map) and a second mesh segment 512 (corresponding to at least one virtual object in the associated texture map) within the first mesh map 51 according to the object texture coordinates provided by the first application.

In the present embodiment, the first mesh segment 511 may include a plurality of first mesh faces not surrounding the second mesh segment 512 and a plurality of second mesh faces surrounding the second mesh segment 512. In FIG. 5, the first mesh faces are labelled with triangles, and the second mesh faces are labelled with stars, but noted that the triangles and stars are just for visual aid and not a part of the first mesh map 511.

In the embodiments of the disclosure, the processor 204 may reduce the first segment area of the first mesh segment 511 via reducing a first area of at least a part of the plurality of first mesh faces. In one embodiment, the processor 204 may reduce a first distance between each of a plurality of first vertices of each of the first mesh faces.

For example, for the first mesh face F1 having first vertices F11 to F14, the processor 204 may reduce the first distance between the first vertices F11 to F14 via adjusting the first vertices F11 to F14 to be closer to be each other, such that the first area of the first mesh face F1 can be reduced. In one embodiment, the processor 204 may adjust the first vertices F11 to F14 to be on the same line or point, such that the first area of the first mesh face F1 can be reduced to be zero, but the disclosure is not limited thereto.

For other first mesh faces (i.e., other mesh faces labelled with the triangle), the processor 204 may reduce the corresponding first area based on the above teachings.

Additionally or alternatively, the processor 204 may reduce the first segment area of the first mesh segment 511 via reducing a second area of at least a part of the plurality of second mesh faces.

In one embodiment, the second mesh segment 512 includes a plurality of surrounding vertices (labelled with solid circles for visual aid). In one embodiment, each of the second mesh faces (labelled with stars) includes at least one second vertex not corresponding to any of the plurality of surrounding vertices and at least one third vertex corresponding to at least one of the plurality of surrounding vertices.

In FIG. 5, the second vertex of each second mesh face is labelled with hollowed circles for visual aid, and the third vertex of each second mesh face can be understood as the surrounding vertices (labelled with solid circles).

In one embodiment, the processor 204 may reduce the second area of at least a part of the plurality of second mesh faces based on the same principle of reducing the first area of the first mesh face (for example, shortening the distance between the second vertices and the third vertices), and the details can be referred to the above embodiments.

In one embodiment, the processor 204 may reduce the second area of at least a part of the plurality of second mesh faces via merging the second vertex of each second mesh face into the third vertex of each second mesh face.

For example, for the second mesh face F2 having second vertices F21, F22 and third vertices F23, F24, the processor 204 may merge the second vertex F21 into the third vertex F23 and merge the second vertex F22 into the third vertex F24. That is, the processor 204 may adjust the position of the second vertex F21 to be the same as the third vertex F23 and adjust the position of the second vertex F22 to be the same as the third vertex F24. In this case, the second area of the second mesh face F2 can be reduced to be zero, but the disclosure is not limited thereto.

In FIG. 5, the processor 204 may modify the first mesh map 51 into the second mesh map 52 via reduce the first segment area of the first mesh segment 511 to be, for example, zero, but the disclosure is not limited thereto. In addition, the processor 204 may reduce the first segment area of the first mesh segment 511 while maintaining the second segment area of the second mesh segment 512 via maintaining the surrounding vertices (labelled with solid circles). That is, the positions of the surrounding vertices of the second mesh segment would not be changed during modifying the first mesh map 51 into the second mesh map 52.

In FIG. 5, since the GPU 206 only needs to determine the pixels corresponding to the second mesh segment 512 within the second mesh map 52 during the ATW operation, the computational loading of the GPU 206 can be reduced, which improves the efficiency of the ATW operation.

To sum up, the embodiments of the disclosure provide a solution to reduce the content/size/information of the mesh map by reducing the area of the mesh segments not corresponding to virtual objects. Since the GPU can perform the ATW operation based on the mesh map with reduced content/size/information, the efficiency of the ATW operation can be improved, and hence the user experience can be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for reducing computational loading while generating a content, applied to a host, the method comprising:
    obtaining, by the host, a texture map and a plurality of object texture coordinates, wherein the plurality of object texture coordinates correspond to at least one virtual object in the texture map;
    obtaining, by the host, a first mesh map corresponding to the texture map;
    determining, by the host, a first mesh segment and a second mesh segment within the first mesh map based on the plurality of object texture coordinates, wherein the first mesh segment does not correspond to the plurality of object texture coordinates, and the second mesh segment corresponds to the plurality of object texture coordinates;
    modifying, by the host, the first mesh map into a second mesh map via reducing a first segment area of the first mesh segment; and
    generating, by the host, a visual content via performing an asynchronous time warp operation on the texture map based on the second mesh map.

2. The method according to claim 1, wherein the step of obtaining the texture map and the plurality of object texture coordinates comprises:
    receiving the texture map and the plurality of object texture coordinates from a first application providing a reality service.

3. The method according to claim 2, wherein the reality service comprises an augmented reality service, and the visual content comprises an augment reality content.

4. The method according to claim 1, wherein the first mesh segment comprises a plurality of first mesh faces not surrounding the second mesh segment and a plurality of second mesh faces surrounding the second mesh segment, and the step of modifying the first mesh map into the second mesh map via reducing the first segment area of the first mesh segment comprises:
reducing a first area of at least a part of the plurality of first mesh faces.

5. The method according to claim 4, wherein the step of modifying the first mesh map into the second mesh map via reducing the first segment area of the first mesh segment further comprises:
reducing a second area of at least a part of the plurality of second mesh faces.

6. The method according to claim 4, wherein each of the first mesh faces comprises a plurality of first vertices, and the step of reducing the first area of each of the plurality of first mesh faces comprises:
reducing a first distance between each of the plurality of first vertices of each of the first mesh faces.

7. The method according to claim 4, each of the first mesh faces comprises a plurality of first vertices, and the step of reducing the first area of each of the plurality of first mesh faces comprises:
adjusting the plurality of first vertices of each of the first mesh faces to be on a line or a point.

8. The method according to claim 5, wherein the second mesh segment comprises a plurality of surrounding vertices, each of the second mesh faces comprises at least one second vertex not corresponding to any of the plurality of surrounding vertices and at least one third vertex corresponding to at least one of the plurality of surrounding vertices, and the step of reducing the second area of at least the part of the plurality of second mesh faces comprises:
merging the least one second vertex into the at least one third vertex.

9. The method according to claim 1, wherein the step of modifying the first mesh map into the second mesh map via reducing the first segment area of the first mesh segment comprises:
modifying the first mesh map into the second mesh map via reducing the first segment area of the first mesh segment while maintaining a second segment area of the second mesh segment.

10. The method according to claim 9, wherein the second mesh segment comprises a plurality of surrounding vertices, and the step of maintaining the second segment area of the second mesh segment comprises:
maintaining the plurality of surrounding vertices.

11. A host, comprising:
a non-transitory storage circuit, storing a program code;
a processor, coupled to the non-transitory storage circuit and accessing the program code to perform:
obtaining a texture map and a plurality of object texture coordinates, wherein the plurality of object texture coordinates correspond to at least one virtual object in the texture map;
obtaining a first mesh map corresponding to the texture map;
determining a first mesh segment and a second mesh segment within the first mesh map based on the plurality of object texture coordinates, wherein the first mesh segment does not correspond to the plurality of object texture coordinates, and the second mesh segment corresponds to the plurality of object texture coordinates;
modifying the first mesh map into a second mesh map via reducing a first segment area of the first mesh segment; and
a graphic processing unit, coupled to the processor and generating a visual content via performing an asynchronous time warp operation on the texture map based on the second mesh map.

12. The host according to claim 11, wherein the processor performs:
receiving the texture map and the plurality of object texture coordinates from a first application providing a reality service.

13. The host according to claim 12, wherein the reality service comprises an augmented reality service, and the visual content comprises an augment reality content.

14. The host according to claim 11, wherein the first mesh segment comprises a plurality of first mesh faces not surrounding the second mesh segment and a plurality of second mesh faces surrounding the second mesh segment, and the processor performs:
reducing a first area of at least a part of the plurality of first mesh faces.

15. The host according to claim 14, wherein the processor performs:
reducing a second area of at least a part of the plurality of second mesh faces.

16. The host according to claim 14, wherein each of the first mesh faces comprises a plurality of first vertices, and the processor performs:
reducing a first distance between each of the plurality of first vertices of each of the first mesh faces.

17. The host according to claim 14, each of the first mesh faces comprises a plurality of first vertices, and the processor performs:
adjusting the plurality of first vertices of each of the first mesh faces to be on a line or a point.

18. The host according to claim 15, wherein the second mesh segment comprises a plurality of surrounding vertices, each of the second mesh faces comprises at least one second vertex not corresponding to any of the plurality of surrounding vertices and at least one third vertex corresponding to at least one of the plurality of surrounding vertices, and the processor performs:
merging the least one second vertex into the at least one third vertex.

19. The host according to claim 11, wherein the processor performs:
modifying the first mesh map into the second mesh map via reducing the first segment area of the first mesh segment while maintaining a second segment area of the second mesh segment.

20. The host according to claim 19, wherein the second mesh segment comprises a plurality of surrounding vertices, and the processor performs:
maintaining the second segment area of the second mesh segment via maintaining the plurality of surrounding vertices.

* * * * *